United States Patent [19]

Nishii

[11] Patent Number: 5,416,785
[45] Date of Patent: May 16, 1995

[54] DATA COMMUNICATION APPARATUS HAVING MEMORY CONTROL IN AN ERROR CORRECTION COMMUNICATION MODE

[75] Inventor: Teruyuki Nishii, Yokohama, Japan

[73] Assignee: Canon Kabushiki Kaisha, Tokyo, Japan

[21] Appl. No.: 858,411

[22] Filed: Mar. 27, 1992

[30] Foreign Application Priority Data

Mar. 29, 1991 [JP] Japan .................................. 3-65829

[51] Int. Cl.[6] .................................. G06F 11/14
[52] U.S. Cl. .................................. 371/32; 358/404
[58] Field of Search .............. 371/32, 33; 358/404, 358/406, 437, 439

[56] References Cited

U.S. PATENT DOCUMENTS

| | | | |
|---|---|---|---|
| 4,646,300 | 2/1987 | Goodman et al. | 371/33 |
| 4,829,524 | 5/1989 | Yoshida | 371/32 |
| 4,885,755 | 12/1989 | Yoshida | 375/58 |
| 4,897,831 | 1/1990 | Negi et al. | 370/29 |
| 4,975,783 | 12/1990 | Takaoka | 358/404 |
| 5,031,179 | 7/1991 | Yoshida et al. | 371/32 |
| 5,075,783 | 12/1991 | Yoshida et al. | 358/439 |
| 5,103,318 | 4/1992 | Takaoka | 358/404 |
| 5,105,423 | 4/1992 | Tanaka et al. | 371/5.5 |
| 5,127,013 | 6/1992 | Yoshida . | |
| 5,172,246 | 12/1992 | Yoshida | 358/406 |
| 5,208,681 | 5/1993 | Yoshida | 358/404 |
| 5,220,439 | 6/1993 | Yoshida | 358/404 |
| 5,253,077 | 10/1993 | Hasegawa et al. | 358/404 |

FOREIGN PATENT DOCUMENTS 3927180 2/1990 Germany .
2222740 3/1990 United Kingdom .

*Primary Examiner*—Charles E. Atkinson
*Attorney, Agent, or Firm*—Fitzpatrick, Cella, Harper & Scinto

[57] ABSTRACT

A data communication apparatus having an error correction communication function includes a memory for storing received data, a processor for processing the data stored in the memory, and device for sending out a retransmission request signal for previously received data when next data cannot be stored in the memory.

12 Claims, 3 Drawing Sheets

DATA COMMUNICATION APPARATUS HAVING MEMORY CONTROL IN AN ERROR CORRECTION COMMUNICATION MODE

BACKGROUND OF THE INVENTION

1. Field of the Invention

The present invention relates to a data communication apparatus, and more particularly to a data communication apparatus having an error correction communication mode.

2. Related Background Art

A facsimile device having an error correction communication mode (ECM communication of the CCITT Recommendation) has been known. In the prior art facsimile communication, a minimum transmission time is set and updated in accordance with the performance of a receiver (such as the decoding performance and printing speed). However, in the ECM communication, communication is made not line by line but block by block and the receiver uses two planes of buffer memory (a maximum frame size is 256 bytes: 256 bytes×256 frames×2 planes=128K bytes), so that the image is received by one plane while the data correctly received by that buffer plane or the data correctly received previously by the other buffer plane is printed out. In the ECM communication, when a receiving station wants to delay transmission from a transmitting station because of a long time required for the printing, the receiving station sends out to the transmitting station a signal (RNR signal) to delay the transmission of the next block.

However, the CCITT T30 Recommendation defines T5=60±5 seconds. Thus, in an apparatus which takes a long time for decoding or printing, there may be a case when the printing is not completed in the T5 time and the data cannot be correctly received.

A facsimile device having an error retransmission mode is disclosed in U.S. Pat. No. 4,829,524 (issued on May 9, 1989), U.S. Pat. No. 4,885,755 (issued on Dec. 5, 1989), U.S. Pat. No. 4,897,831 (issued on Jan. 30, 1990), U.S. Pat. No. 5,031,179 (issued on Jul. 9, 1991), U.S. Pat. No. 5,075,783 (issued on Dec. 24, 1991), U.S. application Ser. No. 670,934 (filed on Mar. 18, 1991) and U.S. application Ser. No. 371,847 (filed on Jun. 27, 1989).

However, there has been no proposal for the solution of the above problems.

SUMMARY OF THE INVENTION

It is an object of the present invention to improve a data communication apparatus.

It is another object of the present invention to enable a low speed data communication apparatus which processes received data to perform data communication in an error correction communication mode.

In order to achieve the above objects, the present invention is provided with means for sending a retransmission request signal for data previously received when the received data has not yet been processed and the next data to be received cannot be stored in memory means. In this manner, processing means gains the data processing time of the memory means so that the data communication in the error correction communication mode is performed even with a low data processing speed communication apparatus.

Other objects of the present invention will be apparent from the following description of the embodiment and the accompanying drawings.

DETAILED DESCRIPTION OF THE PREFERRED EMBODIMENTS

One embodiment of the present invention is now explained in detail with reference to the drawings.

In the following embodiment, a facsimile device having an ECM communication function defined by the CCITT Recommendation is explained, although the present invention is applicable to any data communication apparatus having an error correction communication mode such as a telex and computer communication.

Figure 1:
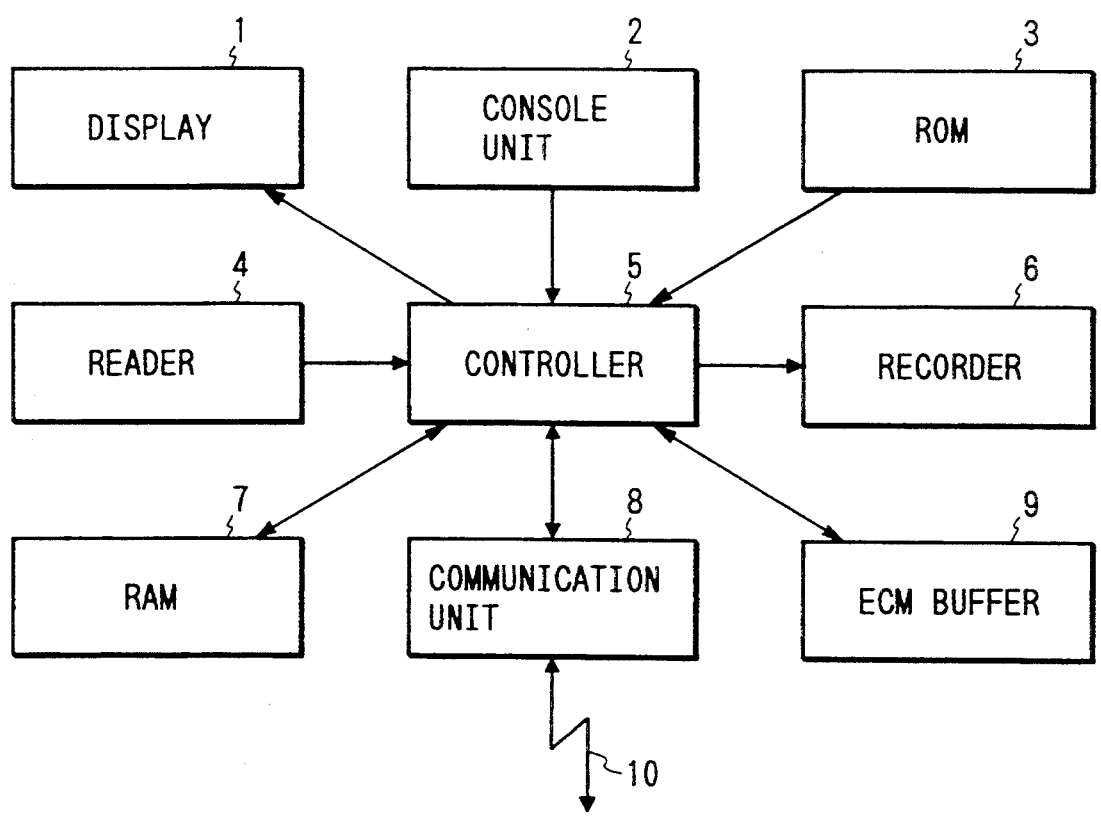
FIG. 1 shows a block diagram of a facsimile device in accordance with one embodiment.

FIG. 1 shows a block diagram of a facsimile device of the present embodiment. Numeral 1 denotes a display for displaying various information, numeral 2 denotes a console unit having a plurality of key entry switches, numeral 3 denotes a ROM for storing a control program, numeral 4 denotes a reader for reading a document image, numeral 5 denotes a controller including a processor to control the entire apparatus in accordance with the program stored in the ROM 3, numeral 6 denotes a recorder for recording a received image, numeral 7 denotes a RAM for temporarily storing various data, numeral 8 denotes a communication unit including an NCU and a modem and numeral 9 denotes an ECM buffer having two planes for storing the received image in the ECM image reception mode. In the ECM reception mode, data is transmitted and received through a communication line 10 and the communication unit 8, and the received image data is sequentially stored in the ECM buffer 9. The stored correct data is sequentially decoded to form one line of print data, which is printed out by the recorder 6.

Figure 2:
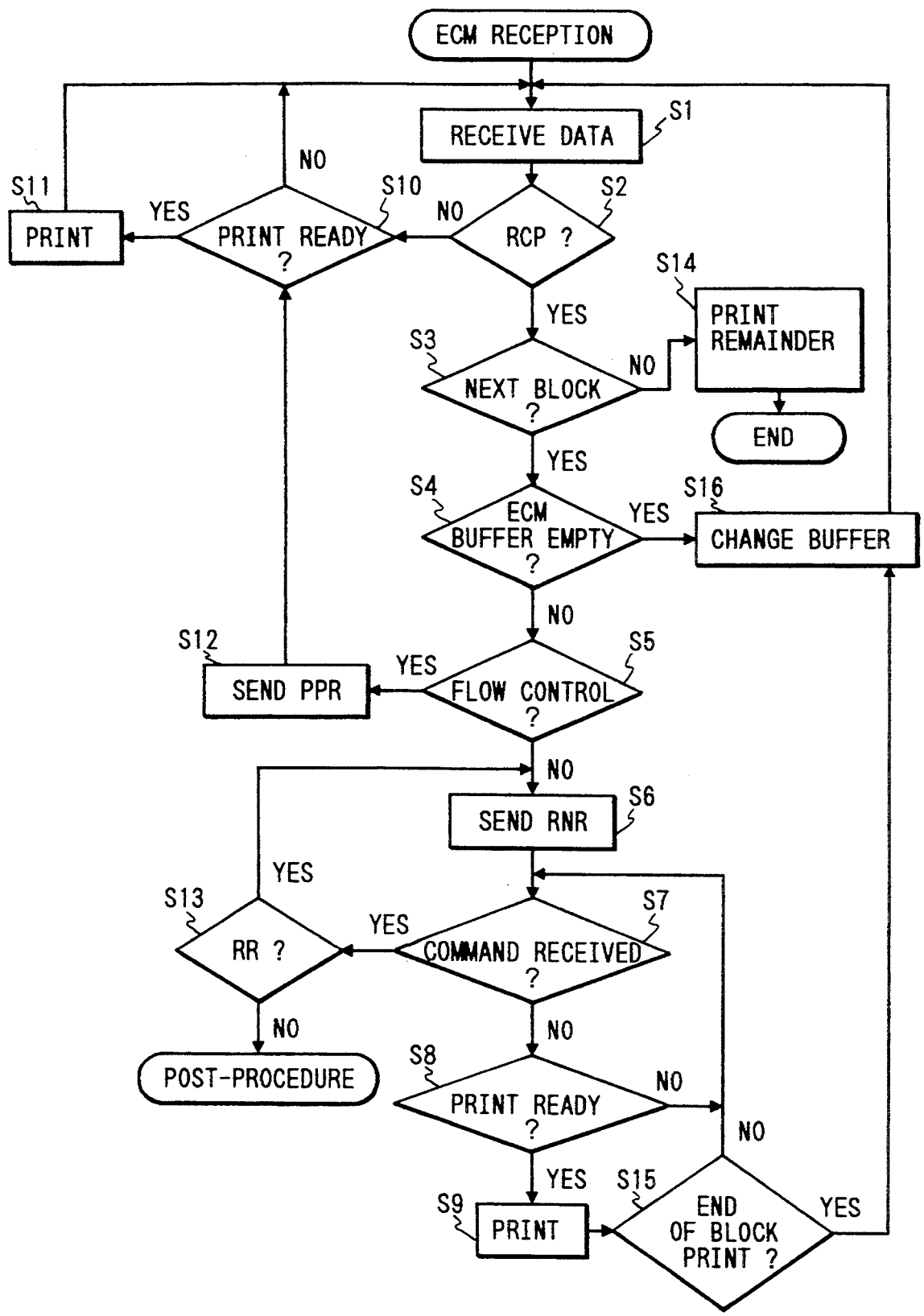
FIG. 2 shows a flow chart of a control operation in the embodiment.

FIG. 2 shows a flow chart of a control operation of the controller 5 of the present embodiment. The operation flow chart of FIG. 2 is now explained in detail. When a call is detected, preprotocol is conducted. When the ECM communication is designated by the transmitter, the ECM reception mode is started and the reception of data is started in a step S1. The image data is HDLC-framed at 256 or 64 bytes/frame and sequentially sent from the transmitter to be stored in a first plane of the ECM buffer 9. The end of the image signal is detected by a HDLC-framed RCP signal (which indicates the end of image signal) in a step S2. The printout of the image may be done when one line of print data is formed from the correctly received frame-by-frame data or collectively when one block of data is formed. In a step S10, one line of printing is performed when the printout is ready, and data is continuously received when the printout is not ready. This loop is repeated.

Figure 3A:
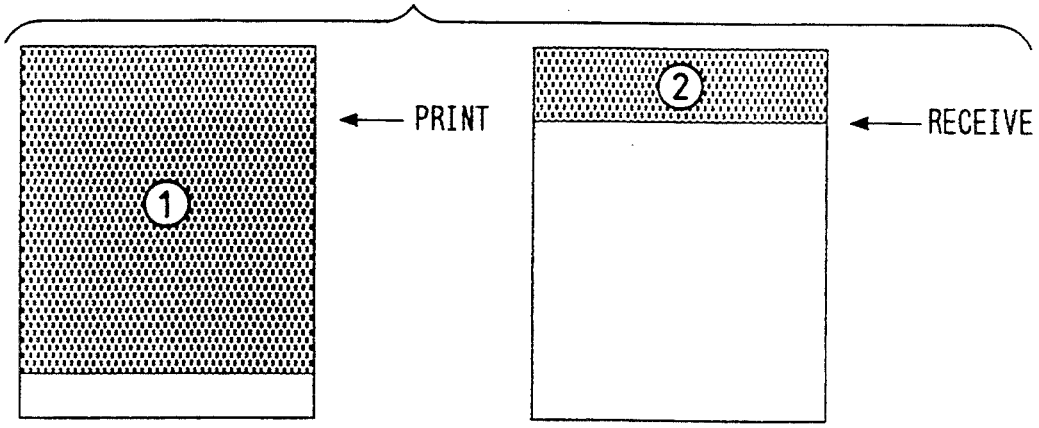
FIGS. 3A and 3B show buffer management charts in an ECM reception mode.

When RCP is detected in the step S2, a Q signal (a MPS signal indicating the presence of the next image, an EOM signal indicating the return to the preprotocol or an EOP signal indicating the end of transmission of the image signal) subsequently sent from the transmitter is checked to determine if there is to be transmission of a next block. If there is no transmission of a next block, the line is released in a post-protocol and the remaining image data is decoded to print it out. If there is to be transmission of a next block, whether the second plane of the ECM buffer 9 is busy for decoding or printing or not is determined in a step S4. If the second plane of the ECM buffer 9 is not busy, reception is switched to the other plane of the ECM buffer 9 to start the data reception of the step S1. If the second plane of the ECM buffer 9 is busy for decoding, a RNP signal indicating that the reception is not ready is sent out and the flow control is started, or a PPR signal, which is a retransmission request signal for an error frame, is sent out to gain the required decoding or printing time, depending on the remaining amount of data in the block. A decision criterion used in step S5 is explained with reference to FIG. 3A and FIG. 4. When the second plane of the reception buffer (ECM buffer) is used for processing as shown in FIG. 3A, that is, when the second block of data ② received by the second plane of the ECM buffer terminates while the first block of data ① in the first plane is being decoded for printout and a transmission protocol signal for the third block is received, it is necessary to make the transmitter wait because there is no plane in the ECM buffer 9 which is ready to receive. The remaining data in the first block of data ① is decoded, and if the time required for printout is shorter than T5 (60±5 seconds) of the CCITT T30 Recommendation, the communication may be continued by the flow control (in which when the transmitter sends the RR signal, the receiver sends back the RNR signal to delay the transmission) by the RNR signal and the RR signal which requests the retransmission by the transmitter. When the remaining amount of data cannot be decoded and printed out in the T5 period, the PPR signal which requests the retransmission of the data ② is sent to gain the decoding and printing time. Since the time required for decoding and printing differs from apparatus to apparatus, parameters shown in FIG. 4 may be built in as device constants or they may be set by a service man as externally registered data to attain fine adjustment.

Figure 4:
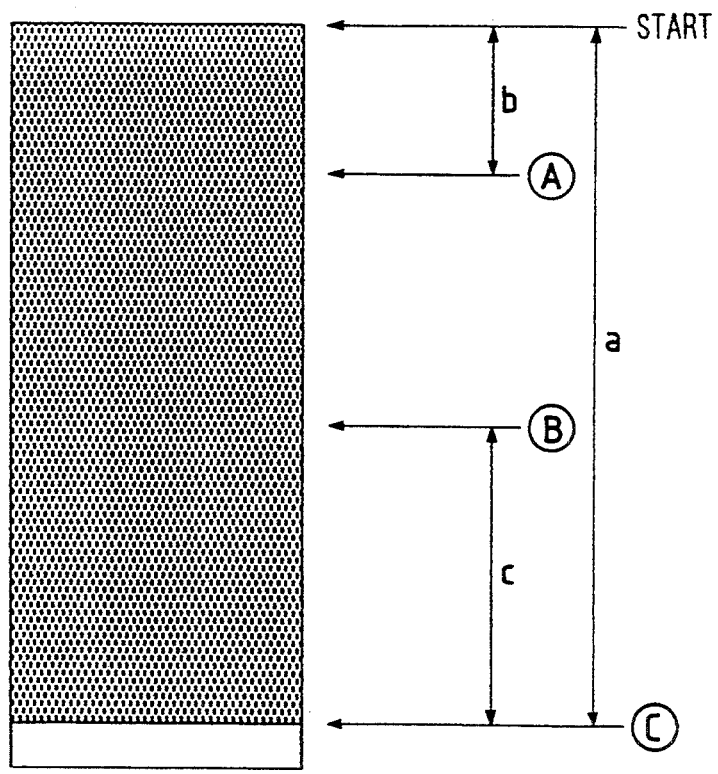
FIG. 4 shows a buffer management chart in an EDM reception mode.

In FIG. 4, a denotes total amount of data to be printed out, b denotes amount of data already printed out at the end of reception of one block, and c denotes amount of data which can be printed out in the T5 period.

Accordingly, the PPR is sent out to request the retransmission of an amount of data corresponding to the time required to print out the remaining data amount of a−(b+c).

Figure 3B:
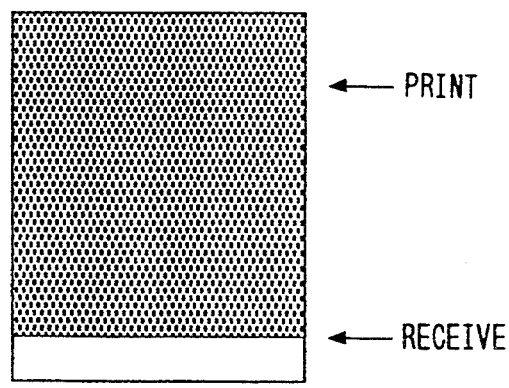

When the reception buffer (ECM buffer) is processing using its first plane as shown in FIG. 3B, b in FIG. 4 is "0" and the PPR request the retransmission of the amount of data corresponding to the time required to print out the remain data amount of a−c is sent.

The decision in step S5 of FIG. 2 is made based on the above decision criterion, and if it is determined that decoding and printing will not be completed in the T5 period, the PPR signal is sent in a step S12 to request retransmission by the transmitter in order to gain the required time. Even if a partial error frame exists, it is preferable from an efficiency standpoint to send the PPR for the entire error frame to gain the required time. The retransmitted frame which has been correctly received may be overwritten but it is preferable to neglect the retransmitted data because there is a possibility of error in the retransmitted data. If the decoding and printing time is determined to be within the T5 period in the decision step S5, the RNR signal is sent back and the decoding and printing are performed (steps S6, S7, S8, S9 and S13). After the printing, the buffer plane is switched in a step S16 and the next block is received.

In the present embodiment, if it is not possible to continue the reception, that is, if it is determined that the decoding and printing will not be completed in the T5 period, the PPR is sent back, and when it is later determined that the decoding and printing can be completed in the T5 period, the flow control is started. Alternatively, the flow control may be first effected and then the PPR may be sent back. In this case, since the line of the transmitter is disconnected in the T5 period, the PPR is sent back a little bit earlier. In this alternative, the number of times of sending back PPR may be smaller than the above method and a defect of fall-back may be solved.

The present invention is not limited to the above embodiment but various modifications thereof may be made.

What is claimed is:

1. A data communication apparatus having an error correction communication function, comprising:
   memory means for storing data received from a transmitter in an error correction communication mode;
   processing means connected to said memory means for processing data stored in said memory means;
   determining means connected to said memory means for determining whether next data to be received from the transmitter can be stored in said memory means or not; and
   sending means connected to said determining means for sending out a retransmission request signal to the transmitter to retransmit previously received data when said determining means determines that the next data cannot be stored in said memory means.

2. A data communication apparatus according to claim 1, wherein when said determining means determines that the next data cannot be stored in said memory means, said sending means first performs a flow control to send out a signal indicating that said apparatus is not ready to receive data, and then sends out the retransmission request signal.

3. A data communication method of an apparatus operating in an error correction communication mode, comprising the steps of:
   storing data received from a transmitter in an error correction communication mode into a memory;
   sequentially processing the data stored in the memory;
   determining whether next data to be received from the transmitter can be stored in the memory or not; and
   requesting the transmitter to retransmit data previously received when there is a determination that the next data cannot be stored in the memory.

4. A data communication method according to claim 3, wherein when there is a determination that the next data cannot be stored in the memory, a signal indicating that the apparatus is not ready to receive data is first sent out to the transmitter to cause the transmitter to delay transmission of the next data for a predetermined period, and when there is a determination that the next data cannot be stored in the memory after the predetermined period has elapsed, retransmission of the previously received data is requested.

5. A method according to claim 3, wherein said requesting step requests retransmission of data previously received correctly.

6. A method according to claim 3, wherein said requesting step requests retransmission of all previously received frames of data.

7. A method according to claim 3, further comprising the step of overwriting data transmitted in reply to said requesting step over corresponding data previously received and stored in the memory when there is a determination that the next data cannot be stored in the memory.

8. A method according to claim 3, further comprising the step of suppressing writing of data transmitted in reply to said requesting step in the memory when there is a determination that the next data cannot be stored in the memory.

9. An apparatus according to claim 1, wherein said sending means sends a retransmission request signal requesting retransmission of data previously received correctly.

10. An apparatus according to claim 1, wherein said sending means sends a retransmission request signal requesting retransmission of all previously received frames of data.

11. An apparatus according to claim 1, further comprising overwriting means for overwriting data transmitted in reply to the retransmission request signal over corresponding data previously received and stored in said memory means when said determining means determines that the next data cannot be stored in said memory means.

12. An apparatus according to claim 1, further comprising means for suppressing writing of data retransmitted in reply to the retransmission request signal in said memory means when said determining means determines that the next data cannot be stored in said memory means.

* * * * *